(12) United States Patent
Hirayama et al.

(10) Patent No.: US 12,473,211 B2
(45) Date of Patent: Nov. 18, 2025

(54) SYSTEM AND METHOD OF DECOMPOSING FLUIDIC PRODUCT HAVING PARTICLES

(71) Applicant: DHF AMERICA, LLC., Raleigh, NC (US)

(72) Inventors: Kotaro Hirayama, Tokyo (JP); Isamu Umeda, Tokyo (JP); Sojiro Kimura, Tokyo (JP)

(73) Assignee: DHF AMERICA, LLC., Raleigh, NC (US)

( * ) Notice: Subject to any disclaimer, the term of this patent is extended or adjusted under 35 U.S.C. 154(b) by 192 days.

(21) Appl. No.: 17/596,806

(22) PCT Filed: Jun. 24, 2020

(86) PCT No.: PCT/US2020/039259
§ 371 (c)(1),
(2) Date: Dec. 17, 2021

(87) PCT Pub. No.: WO2020/263905
PCT Pub. Date: Dec. 30, 2020

(65) Prior Publication Data
US 2022/0212954 A1    Jul. 7, 2022

Related U.S. Application Data

(60) Provisional application No. 62/865,620, filed on Jun. 24, 2019.

(51) Int. Cl.
*C02F 1/04* (2023.01)
*C02F 1/00* (2023.01)
(Continued)

(52) U.S. Cl.
CPC .............. *C02F 1/043* (2013.01); *C02F 1/008* (2013.01); *C02F 1/048* (2013.01); *H05B 6/06* (2013.01);
(Continued)

(58) Field of Classification Search
None
See application file for complete search history.

(56) References Cited

U.S. PATENT DOCUMENTS

| 135,245 A | * | 1/1873 | Pasteur | ..................... A23L 2/76 |
| | | | | 99/275 |
| 141,072 A | * | 7/1873 | Pasteur | .................... C12N 1/18 |
| | | | | 435/255.2 |

(Continued)

FOREIGN PATENT DOCUMENTS

| CN | 101358322 A1 | 2/2009 | |
| EP | 2508254 A1 * | 10/2012 | ............ B01J 19/087 |

(Continued)

OTHER PUBLICATIONS

Induction Heating—Wikipedia—Downloaded May 1, 2024—Six Pages (Year: 2024).*

(Continued)

*Primary Examiner* — Robert J Popovics
(74) *Attorney, Agent, or Firm* — Greer, Burns & Crain, Ltd

(57) ABSTRACT

A method of decomposing a fluidic product (110) having a plurality of particles (112) is disclosed. The method includes inductively heating the fluidic product (110) at a first predetermined temperature while flowing through a temperature rising portion (138) having a first heating region formed of at least one metal pipe (124) by using a first heating induction coil (134) surrounding the first heating region; holding a temperature of the fluidic product (110) at approximately the first predetermined temperature for a predetermined reaction period while flowing through a temperature holding portion (140) having a second heating region formed of at least one metal pipe (124) by inductively heating the temperature holding portion (140) using a second heating induction coil (136) surrounding the second (Continued)

heating region; and decomposing the fluidic product (110) while flowing through the temperature rising portion (138) and the temperature holding portion (140) during the predetermined reaction period.

9 Claims, 6 Drawing Sheets

(51) Int. Cl.
  *H05B 6/06* (2006.01)
  *H05B 6/10* (2006.01)
(52) U.S. Cl.
  CPC .......... *H05B 6/108* (2013.01); *C02F 2209/02* (2013.01); *C02F 2301/024* (2013.01)

(56) References Cited

U.S. PATENT DOCUMENTS

| | | | | |
|---|---|---|---|---|
| 336,385 | A * | 2/1886 | Chamberland | B01D 39/04 210/510.1 |
| 2,927,097 | A * | 3/1960 | Von Berg | B01J 19/2435 422/138 |
| 3,625,843 | A * | 12/1971 | Doevenspeck | C12H 1/165 426/247 |
| 3,889,009 | A * | 6/1975 | Lipoma | A23B 2/08 426/243 |
| 4,358,652 | A * | 11/1982 | Kaarup | H05B 6/6458 219/688 |
| 4,721,575 | A * | 1/1988 | Binning | B01J 19/243 422/235 |
| 5,370,801 | A * | 12/1994 | Sorensen | C02F 3/08 210/742 |
| 5,571,550 | A * | 11/1996 | Polny, Jr. | A23B 5/01 426/244 |
| 5,710,360 | A * | 1/1998 | Self | A62D 3/40 204/158.21 |
| 5,750,966 | A * | 5/1998 | Ruozi | A23L 3/01 219/710 |
| 6,605,750 | B1 | 8/2003 | Bessho et al. | |
| 7,513,061 | B2 * | 4/2009 | Hirayama | F26B 23/04 34/594 |
| 8,033,754 | B2 * | 10/2011 | Keyes | F16L 59/15 405/184 |
| 8,163,176 | B2 * | 4/2012 | Hill | B01D 21/009 210/534 |
| 9,004,817 | B2 * | 4/2015 | Hanasaka | B09C 1/06 405/128.85 |
| 2002/0141874 | A1 | 10/2002 | Schoenmeyr | |
| 2007/0272626 | A1 * | 11/2007 | Hirayama | F26B 17/107 210/770 |
| 2008/0087661 | A1 | 4/2008 | Haag et al. | |
| 2011/0041925 | A1 | 2/2011 | Keyes et al. | |
| 2011/0042328 | A1 * | 2/2011 | Hill | B01D 21/009 210/187 |
| 2013/0211118 | A1 * | 8/2013 | Dixit | C07F 7/003 422/198 |
| 2017/0233327 | A1 | 8/2017 | Johannsen et al. | |
| 2021/0300790 | A1 * | 9/2021 | Beveridge | B01D 1/24 |
| 2022/0212954 | A1 * | 7/2022 | Hirayama | H05B 6/06 |

FOREIGN PATENT DOCUMENTS

| | | | | |
|---|---|---|---|---|
| JP | 3933493 B2 | 6/2001 | | |
| WO | WO-0136088 A1 * | 5/2001 | ............ | B01J 19/242 |
| WO | WO-2019034829 A1 * | 2/2019 | ............ | B01D 1/223 |

OTHER PUBLICATIONS

Pasteurization—Wikipedia—15 Pages—Downloaded Apr. 4, 2024 (Year: 2024).*
Reynolds Number—Wikipedia—17 Pages—Downloaded—May 1, 2024 (Year: 2024).*
International Search Report and Written Opinion received for PCT/US2020/039259, mailed Oct. 29, 2020.
International Preliminary Report on Patentability received for PCT/US2020/039259, mailed mailed Jul. 19, 2021.
Japanese Unexamined Patent Application Publication: JP 1997-94456 (18 pages).
Japanese Unexamined Patent Application Publication: JP 2012-508109L, Translation of PCT Application (41 pages).
Japanese Unexamined Patent Application Publication: JP 2009-066541 (8 pages).

* cited by examiner

SYSTEM AND METHOD OF DECOMPOSING FLUIDIC PRODUCT HAVING PARTICLES

BACKGROUND

The present invention relates to a reaction decomposing reactor, and more specifically relates to a subcritical water decomposing reactor for heating and pressurizing aqueous suspension while passing through the reactor.

Existing decomposing reactors are used to decompose an aqueous solution having particles into a treated product through one or more chemical reactions. In certain cases, the particles of the aqueous solution include biological materials, such as fiber (e.g., cotton) particles, or in some cases, include organic materials, such as plastic particles. During operation, the aqueous solution in the decomposing reactor is stirred and heated in a reaction vessel for inducing the chemical reactions for the biological materials and/or the organic materials in the aqueous solution. The decomposing reactor produces the treated product through the chemical reactions of the biological materials and/or the organic materials in the aqueous solution.

A disadvantage of the existing decomposing reactors is that a reaction level of the aqueous solution may be inconsistent to control the chemical reactions of the particles. Specifically, referring now to FIG. 1, an exemplary graphical presentation 10 of a reaction level 12 of the aqueous solution is shown using the existing chemical reactor. In FIG. 1, an X-axis represents the reaction level 12 of the aqueous solution, and a Y-axis represents a reaction amount 14 of the aqueous solution.

For example, the reaction level 12 refers to a degree of chemical reaction occurred in the aqueous solution having the particles (which turns into the treated product), and the reaction amount 14 refers to a volume or weight amount of the aqueous solution having the particles. As shown in FIG. 1, the reaction level 12 of the aqueous solution is not constant relative to the reaction amount 14.

Another disadvantage of the existing decomposing reactors is that precisely determining an optimal reaction level or amount at point 16 can be time consuming, thereby increasing operational expenses. More specifically, although the optimal reaction level and/or amount at point 16, representing a desired reaction level and/or amount of the aqueous solution, can be achieved using the existing decomposing reactor, an insufficient reaction level at point 18 or an overabundant reaction level at point 20 may also be achieved during decomposition.

Such undesired reaction levels and/or amounts at points 18 and 20, represented on gradually inclining or declining slopes, make it difficult to determine the optimal reaction amount and/or level for the aqueous solution. A proper decomposition of the aqueous solution may not be achieved without precisely determining the optimal reaction amount and/or level.

Thus, there is a need to develop an enhanced decomposing reactor that overcomes one or more above-described disadvantages of the existing decomposing reactors.

SUMMARY

In one embodiment of the present disclosure, a method of decomposing a fluidic product having a plurality of particles is disclosed. The method includes inductively heating the fluidic product at a first predetermined temperature while flowing through a temperature rising portion having a first heating region formed of at least one metal pipe in such a manner that a hollow portion of the at least one metal pipe functions as a flow path for the fluidic product by using a first heating induction coil surrounding the first heating region; holding a temperature of the fluidic product at approximately the first predetermined temperature for a predetermined reaction period while flowing through a temperature holding portion having a second heating region formed of at least one metal pipe in such a manner that the hollow portion of the at least one metal pipe functions as the flow path for the fluidic product by inductively heating the temperature holding portion using a second heating induction coil surrounding the second heating region; and decomposing the fluidic product having the plurality of particles while flowing through the temperature rising portion and the temperature holding portion during the predetermined reaction period.

In one example, the method further includes applying a first predetermined electric power to the first heating induction coil surrounding the first heating region, and applying a second predetermined electric power to the second heating induction coil surrounding the second heating region. In a variation, the method further includes selecting the second predetermined electric power that is lower than the first predetermined electric power.

In another example, the method further includes seamlessly connecting the at least one metal pipe of the temperature rising portion and the at least one metal pipe of the temperature holding portion between the temperature rising portion and the temperature holding portion. In a variation, the method further includes including at least one seamless bending region in at least one of: the temperature rising portion and the temperature holding portion.

In yet another example, the method further includes delivering the fluidic product having the plurality of particles in the temperature rising portion using a static mixer mounted in the hollow portion of the at least one metal pipe. In a variation, the method further includes using a screw feeder as the static mixer mounted in the hollow portion of the at least one metal pipe.

In still another example, the method further includes pulsating a flow rate of the fluidic product having the plurality of particles in at least one of: the temperature rising portion and the temperature holding portion to avoid settlement of the plurality of particles in the at least one metal pipe.

In yet still another example, the method further includes including at least one seamless bending region having an elbowless portion in the temperature rising portion. In a variation, the method further includes including the at least one seamless bending region having a bending diameter that is greater than an inner diameter of the at least one metal pipe and up to three times larger than the inner diameter of the at least one metal pipe in the temperature rising portion.

In a further example, the method further includes including at least one seamless bending region having an elbowless portion in the temperature holding portion. In a variation, the method further includes including the at least one seamless bending region having a bending diameter that is greater than an inner diameter of the at least one metal pipe and up to three times larger than the inner diameter of the at least one metal pipe in the temperature holding portion.

In a yet further example, the method further includes driving the first heating induction coil using the high-frequency power supply unit configured to increase a temperature of the at least one metal pipe in the temperature rising portion to the first predetermined temperature. In a variation, the method further includes driving the second heating induction coil using the high-frequency power supply unit configured to increase the temperature of the at least one metal pipe in the temperature holding portion to a second predetermined temperature that is higher than the first predetermined temperature.

In a still further example, the method further includes setting the first predetermined temperature between 100-350 degrees Celsius.

In a yet still further example, the method further includes varying the predetermined reaction period based on a type of substance in the plurality of particles. In a variation, the method further includes including at least one of: a biological material and an organic material as the type of substance in the plurality of particles. In a further example, the method further includes determining a length of the at least one metal pipe in at least one of: the temperature rising portion and the temperature holding portion based on the predetermined reaction period. In another example, the method further includes cooling the first heating induction coil using a first refrigerant passage associated with the temperature rising portion.

In yet another example, the method further includes cooling the second heating induction coil using a second refrigerant passage associated with the temperature holding portion.

In still another example, the method further includes positioning the at least one metal pipe in the temperature rising portion at a predetermined angle relative to a horizontal plane.

In yet still another example, the method further includes positioning the at least one metal pipe in the temperature rising portion lower than the at least one metal pipe in the temperature holding portion.

In a further example, the method further includes including at least one seamless bending region having a first bent portion, a second bent portion and a straight portion in at least one of: the temperature rising portion and the temperature holding portion. In a variation, the method further includes disposing the straight portion between the first bent portion and the second bent portion.

In another embodiment of the present disclosure, a system of decomposing a fluidic product having a plurality of particles is disclosed. The system includes a controller communicably connected to an induction heating assembly configured to inductively heat the fluidic product at a first predetermined temperature while flowing through a temperature rising portion having a first heating region formed of at least one metal pipe in such a manner that a hollow portion of the at least one metal pipe functions as a flow path for the fluidic product by using a first heating induction coil. The controller is configured to instruct the induction heating assembly to hold a temperature of the fluidic product at approximately the first predetermined temperature for a predetermined reaction period while flowing through a temperature holding portion having a second heating region formed of at least one metal pipe in such a manner that the hollow portion of the at least one metal pipe functions as the flow path for the fluidic product by inductively heating the temperature holding portion using a second heating induction coil. The controller is configured to instruct the induction heating assembly to decompose the fluidic product having the plurality of particles while flowing through the temperature rising portion and the temperature holding portion during the predetermined reaction period.

In one example, the controller is configured to instruct a power supply unit to apply a first predetermined electric power to the first heating induction coil surrounding the first heating region, and apply a second predetermined electric power to the second heating induction coil surrounding the second heating region. In a variation, the controller is configured to select the second predetermined electric power that is lower than the first predetermined electric power.

In another example, the controller is configured to instruct a pump to pulsate a power output of the pump such that a flow rate of the fluidic product is varied in at least one of: the temperature rising portion and the temperature holding portion.

In yet another example, the system includes at least one seamless bending region having an elbowless portion in at least one of: the temperature rising portion and the temperature holding portion. In a variation, the at least one seamless bending region has a bending diameter that is greater than an inner diameter of the at least one metal pipe and up to three times larger than the inner diameter of the at least one metal pipe in at least one of: the temperature rising portion and the temperature holding portion.

In still another example, the controller is configured to set the first predetermined temperature between 100-350 degrees Celsius.

In still yet another example, the at least one metal pipe in the temperature rising portion is positioned at a predetermined angle relative to a horizontal plane.

In a further example, the at least one metal pipe in the temperature rising portion is positioned lower than the at least one metal pipe in the temperature holding portion.

In a yet further example, at least one seamless bending region having a first bent portion, a second bent portion and a straight portion is included in at least one of: the temperature rising portion and the temperature holding portion. In a variation, the straight portion is disposed between the first bent portion and the second bent portion.

The methods, systems, and apparatuses disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Embodiments of the present disclosure will be described in detail herebelow with reference to the attached drawings.

Figure 1:
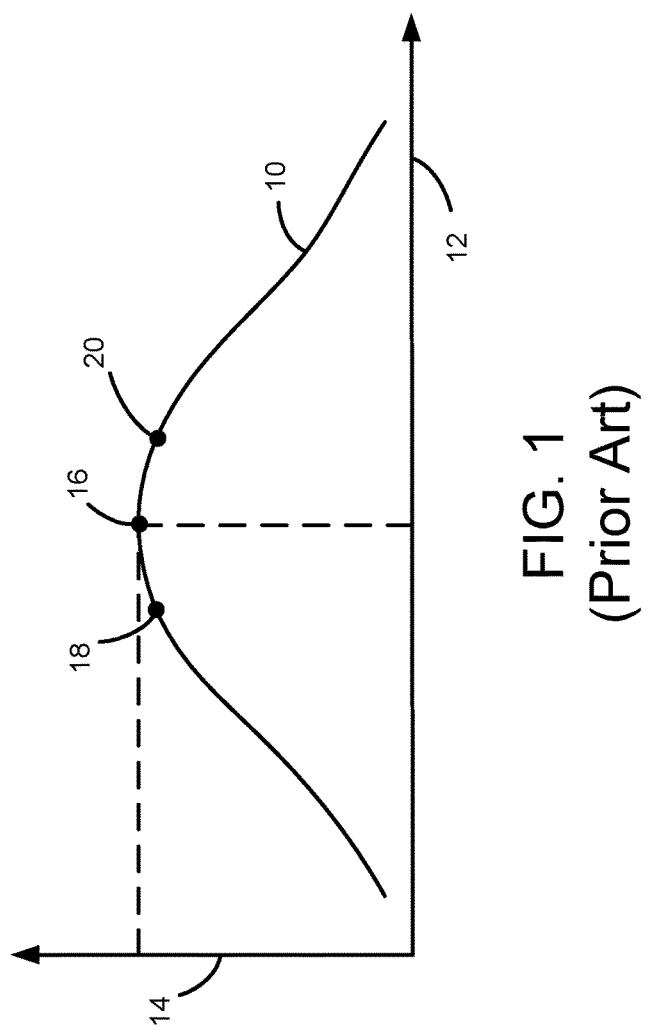
FIG. 1 illustrates an exemplary graphical presentation of a reaction level and a reaction amount of an aqueous solution having particles using an existing chemical reactor.
Figure 2:
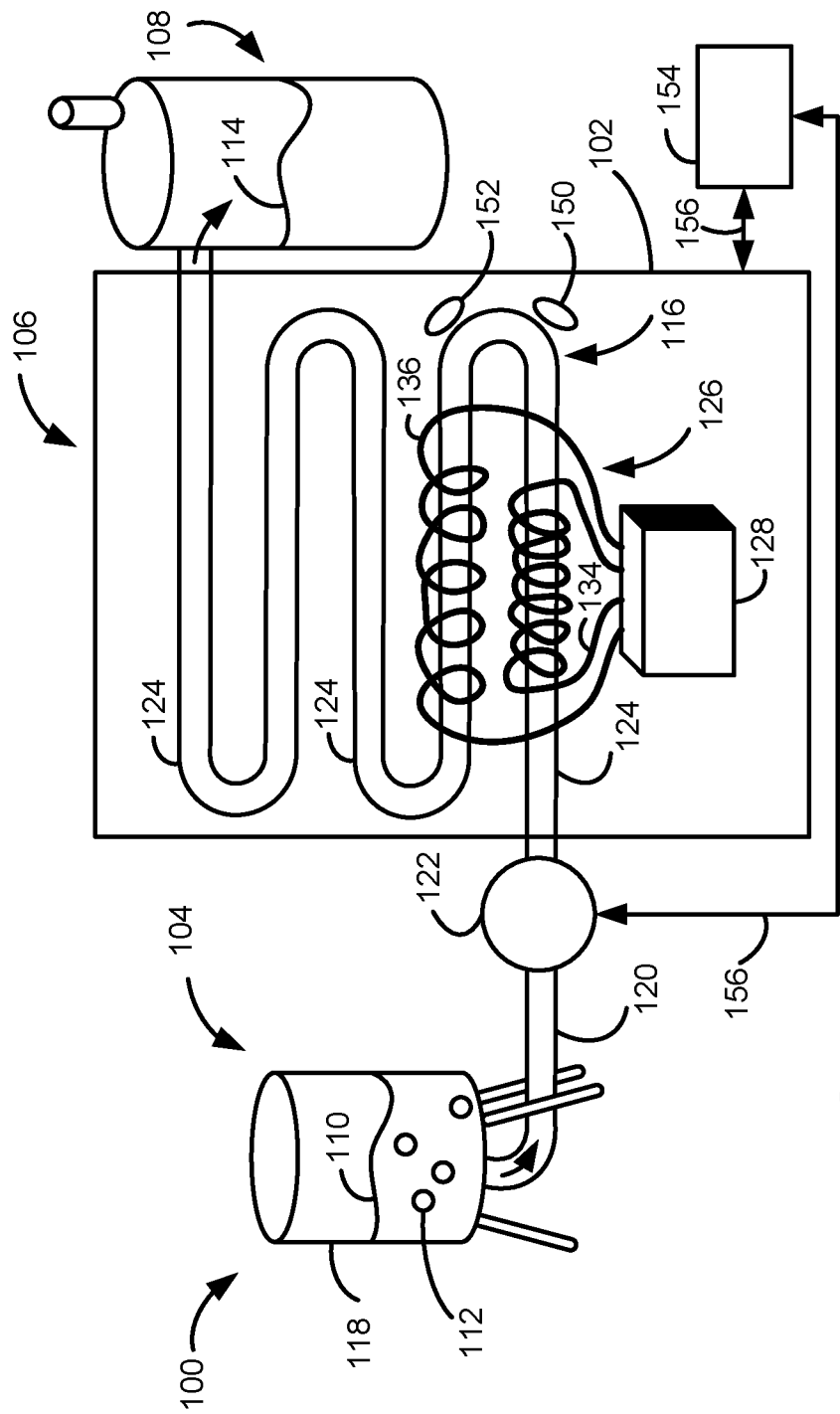
FIG. 2 illustrates a schematic diagram of an exemplary decomposing system having an induction heating assembly in accordance with embodiments of the present disclosure.

Referring now to FIG. 2, an exemplary decomposing system 100 having an induction heating assembly 102 is shown in accordance with embodiments of the present disclosure. In the illustrated embodiment, the decomposing system 100 includes a raw material supply zone 104, a heating treatment zone 106, and a treated object retrieving zone 108. The decomposing system 100 performs a decomposing treatment for converting an aqueous solution 110 having a plurality of particles 112 into a treated product 114 to be stored in the treated object retrieving zone 108 for subsequent retrieval.

Exemplary particles 112 include a biological material and/or an organic material. In one example, the biological material can include an agricultural waste, such as cotton, straw, corn, peanut byproducts and the like, and the organic material can include resin, plastic, polymer, polyethylene, polyester, polypropylene, and the like. Other suitable materials, such as inorganic substances, can also be included as the particles 112 to suit the application.

Other exemplary particles 112 can include different fiber materials. In one example, the fiber materials include plastic-based fibers, cellulose-based fibers, and/or protein-based fibers. For example, the plastic-based fibers include polyester, nylon, acrylic, and elastane fibers, the cellulose-base fibers include cotton, viscose, lyocell, and bast fibers (e.g., linen, hemp, or jute materials), and the protein-based fibers include wool and silk fibers.

The respective zones 104, 106, 108 can be arranged in the order shown in FIG. 2, and respectively treat the successively flowing and passing aqueous solution 110 to be treated by the induction heating assembly 102. For example, the aqueous solution 110 can be fed through a hollow portion of a pipe body 116 of the induction heating assembly 102. In one embodiment, the pipe body 116 is made of any suitable metal material, such as stainless steel.

In FIG. 2, the raw material supply zone 104 includes a tank 118 for storing a proper amount of the aqueous solution 110 to be treated by the induction heating assembly 102. A feed path 120 formed of a metal pipe (e.g., stainless steel) is connected at one end to the tank 118 and at the other end to the induction heating assembly 102. A typical example of the tank 118 has a tank capacity of 1000 liters (L), a discharge pressure of 0.1 megapascal (MPa), and a flow rate of 10-40 liter per minute (L/min). However, the tank capacity, the discharge pressure, and the flow rate can vary to suit different applications. A pump 122, for example, can be connected to the feed path 120 for increasing the discharge pressure of the aqueous solution 110 and for forcibly securing the flow rate of the aqueous solution 110 in the feed path 120.

As shown in FIG. 2, the heating treatment zone 106 includes the induction heating assembly 102 having the pipe body 116. To induce the chemical reaction in the aqueous solution 110, the induction heating assembly 102 inductively heats the aqueous solution 110 to a predetermined treatment temperature while the aqueous solution 110 is fed in the pipe body 116. Specifically, the pipe body 116 of the heating treatment zone 106 includes one or more metal pipes 124 functioning as a feed heating kiln body. An exemplary treatment temperature ranges approximately between 100-350 degrees Celsius (° C.).

Further, the induction heating assembly 102 includes one or more heating induction coils 126 configured to surround at least a portion of the metal pipes 124, and a high-frequency power supply unit 128 configured to inductively drive the heating induction coils 126. In order to use a hollow portion of the metal pipe 124 as a flow path for the aqueous solution 110, the metal pipe 124 has one end communicating with and connected to a discharge end of the feed path 120 of the raw material supply zone 104, and is made of stainless steel to be inductively heated by the heating induction coils 126.

A typical inner diameter of each metal pipe 124 is approximately 50 millimeters (mm) or 2 inches and a typical length of each metal pipe 124 is approximately 10 meters. In embodiments, the inner diameter of each metal pipe 124 can range between 2 and 4 inches, and the length of each metal pipe 124 can range between 10 and 80 meters depending on the type of substance of the particles 112 in the aqueous solution 110. For example, for cotton particles, the length can be about 10 meters, but for plastic particles, the length can be about 50 meters. However, the inner diameter and the length can vary to suit different applications.

In one embodiment, an overall length of the metal pipe(s) 124 used in the induction heating assembly 102 is determined based on a predetermined reaction time period associated with the aqueous solution 110. The predetermined reaction time period may refer to a residence time of the aqueous solution 110 in the induction heating assembly 102 (e.g., see FIG. 3, first heating region 138 and/or second heating region 140) for obtaining the optimal reaction level and/or amount for the aqueous solution 110 having the particles 112.

In one embodiment, the metal pipe 124 may be disposed with an upward inclination to facilitate a feed of the aqueous solution 110 to be treated. However, in another embodiment, the feed path 120 may be disposed with a downward inclination to facilitate the feed of the aqueous solution 110. Other suitable arrangements are also contemplated to suit the application.

Figure 3:
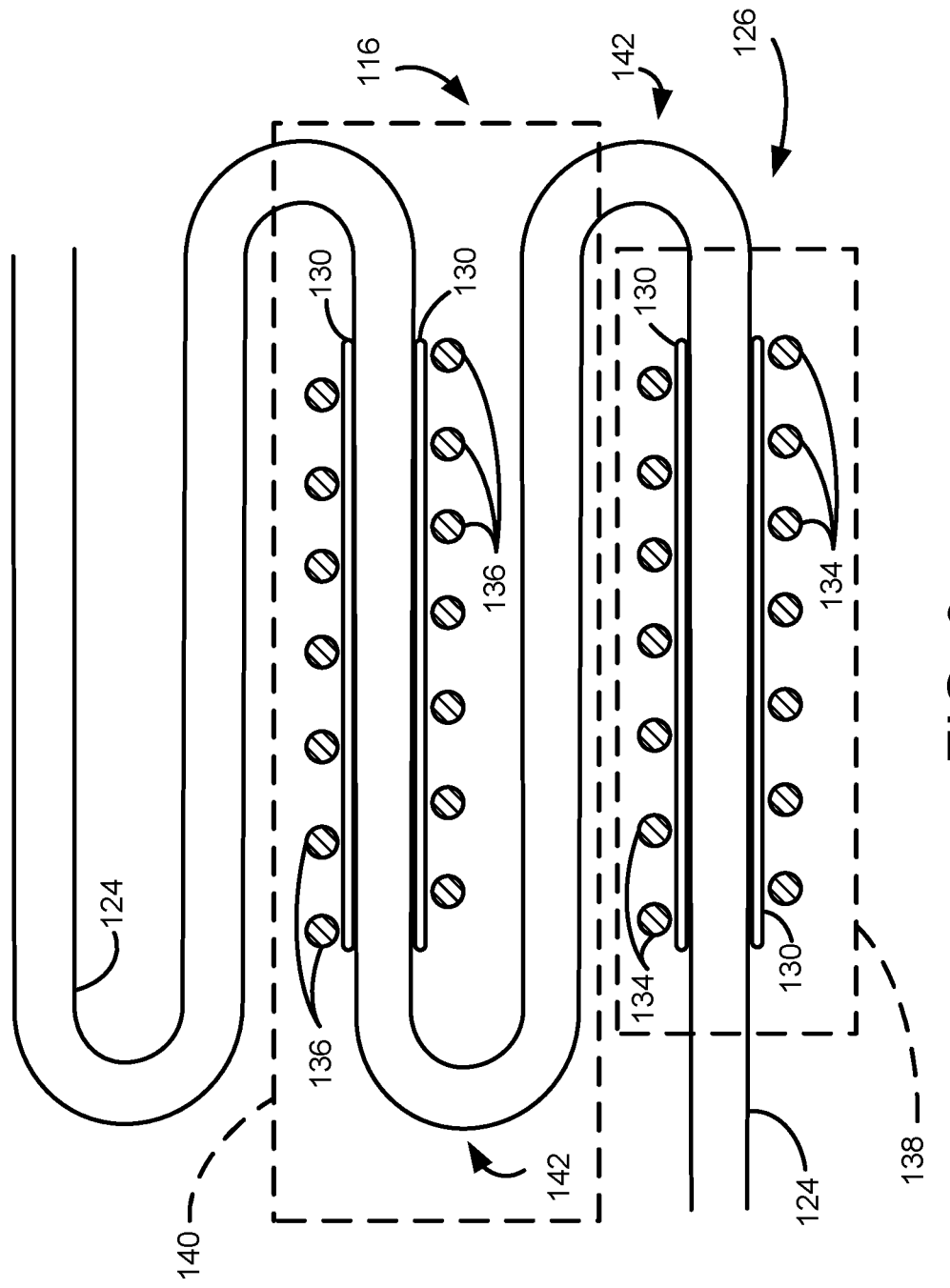
FIG. 3 illustrates a schematic diagram of an exemplary pipe body of the induction heating assembly of FIG. 2.
Figure 4:
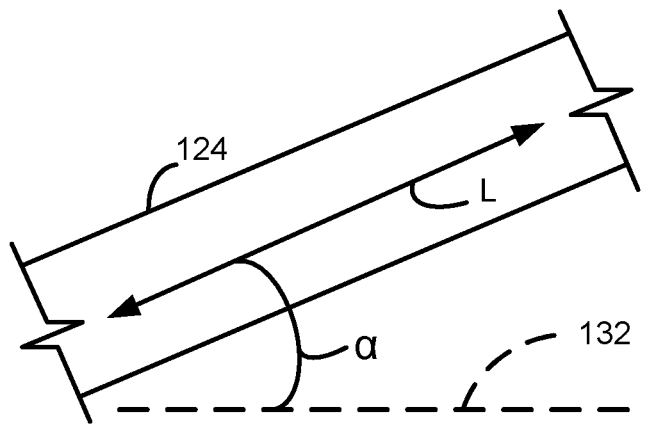
FIG. 4 illustrates a schematic diagram of an exemplary arrangement of a metal pipe used in the induction heating assembly of FIG. 2.

Referring now to FIGS. 2, 3, and 4, each heating induction coil 126 is formed by winding an electric conductor, e.g., a copper pipe, and is supported by an insulator 130 so that a substantially constant space is maintained between the heating induction coil 126 and an outer peripheral surface of the metal pipe 124. A winding pitch of the heating induction coil 126 may be constant or may be varied depending on the application. In one embodiment, the insulator 130 is disposed between the metal pipe 124 and the heating induction coil 126.

The high-frequency power supply unit 128 generates and passes a high-frequency current enough to increase the temperature of the metal pipe 124 to a predetermined treatment temperature, e.g., 100-350° C., for the aqueous solution 110 to be treated using the heating induction coils 126. An exemplary energization frequency of the high-frequency power supply unit 128 can be approximately 20 kilohertz (KHz) and a maximum output can be approximately 270 kilowatts (KW). However, the frequency and the maximum output of the high-frequency power supply unit 128 can vary to suit different applications.

Exemplary arrangements of the metal pipes 124 in the induction heating assembly 102 can be in a horizontal, vertical, or diagonal attitude to suit different applications. However, the diagonal attitude can be selected in consideration of a type of particles 112 and/or the feed of the aqueous solution 110. For example, as shown in FIG. 4, the metal pipe 124 can be preferably installed in an attitude in which a longitudinal axis L of the metal pipe 124 is oriented in a direction angled with respect to a horizontal plane 132 (e.g., a ground surface).

An exemplary angle α of the metal pipe 124 ranges approximately between 3 and 30 degrees relative to the horizontal plane 132. As such, there is a height difference between opposite ends of the metal pipe 124, and the aqueous solution 110 travels from a lower end of the metal pipe 124 to a higher end of the metal pipe 124.

Returning to FIGS. 2 and 3, the heating induction coils 126 of the induction heating assembly 102 includes a first heating induction coil 134 surrounding a first heating region 138 to inductively heat the metal pipe 124 in a temperature rising portion of the induction heating assembly 102. In the illustrated embodiment, the temperature rising portion is the first heating region 138. The high-frequency power supply unit 128 is used to inductively drive the first heating induction coil 134. For example, the high-frequency power supply unit 128 drives the first heating induction coil 134 in the first heating region 138 to increase the temperature of the aqueous solution 110 to the predetermined treatment temperature.

Also, the heating induction coils 126 of the induction heating assembly 102 includes a second heating induction coil 136 surrounding a second heating region 140 to inductively heat the metal pipe 124 in a temperature holding portion of the induction heating assembly 102. In the illustrated embodiment, the temperature holding portion is the second heating region 140. The high-frequency power supply unit 128 is used to inductively drive the second heating induction coil 136.

For example, the high-frequency power supply unit 128 drives the second heating induction coil 136 in the second heating region 140 to maintain the temperature of the aqueous solution 110 at approximately the same predetermined treatment temperature in the first heating region 138.

More specifically, the second heating induction coil 136 holds the aqueous solution 110 at approximately the same predetermined treatment temperature for a predetermined reaction period while flowing through the temperature holding portion 140. The predetermined reaction period may refer to a residence time of the aqueous solution 110 in the induction heating assembly 102 for obtaining the optimal reaction level and/or amount for the aqueous solution 110 having the particles 112. In one embodiment, an overall length of the metal pipe(s) 124 used in the temperature holding portion 140 is determined based on the predetermined reaction period.

In another embodiment, the high-frequency power supply unit 128 drives the second heating induction coil 136 to increase the temperature of the aqueous solution in the metal pipe 124 in the temperature holding portion 140 to a second predetermined temperature (e.g., 250° C.) that is higher than a first predetermined temperature (e.g., 200° C.). In one example, the first predetermined temperature is the temperature of the aqueous solution 110 in the metal pipe 124 in the temperature rising portion 138.

In some embodiment, the pipe body 116 of the heating treatment zone 106 includes a first refrigerant passage 150 (FIG. 2) configured for cooling the first heating induction coil 134 using the first refrigerant passage 150 associated with the temperature rising portion 138. Similarly, the pipe body 116 of the heating treatment zone 106 includes a second refrigerant passage 152 (FIG. 2) configured for cooling the second heating induction coil 136 using the second refrigerant passage 152 associated with the temperature holding portion 140.

In embodiments, the first heating induction coil 134 is applied with a first predetermined electric power, and the second heating induction coil 136 is applied with a second predetermined electric power, wherein the second predetermined electric power is lower than the first predetermined electric power. For example, the first predetermined electric power can be approximately 100 KW and the second predetermined electric power can be approximately 5 KW. Other suitable amounts of electric power can be applied to suit different applications.

In embodiments, the predetermined reaction period can be varied based on a type of substance in the particles 112. For example, when the type of substance in the particles 112 is a biological material, such as cotton particles, the predetermined reaction period can be approximately one (1) minute. In another example, when the type of substance in the particles 112 is an organic material, such as plastic particles, the predetermined reaction period can be approximately forty (40) minutes.

During the predetermined reaction period, the aqueous solution 110 having the particles 112 is decomposed while flowing through the temperature rising portion 138 and the temperature holding portion 140 to obtain the optimal reaction level and/or amount for the particles 112. For example, unlike the existing decomposing reactors, in the present disclosure, the reaction level of the aqueous solution 110 is constant relative to the reaction amount. Detailed descriptions of the reaction level and amount of the present disclosure are provided below in paragraphs relating to FIG. 5.

In embodiments, one or more metal pipes 124 are included in the temperature rising portion 138, and similarly one or more metal pipes 124 are included in the temperature holding portion 140. Although a single metal pipe 124 is shown in the temperature rising portion 138 and the temperature holding portion 140 in FIG. 3, a plurality of metal pipes 124 connected in parallel can also be used to increase a heat transfer area and a flow rate in the temperature rising portion 138 and/or the temperature holding portion 140. In certain embodiments, the metal pipes 124 in the temperature rising portion 138 are positioned lower than the metal pipes 124 in the temperature holding portion 140.

Further, in other embodiments, at least one metal pipe 124 is seamlessly connected between the temperature rising portion 138 and the temperature holding portion 140. For example, as shown in FIG. 3, at least one seamless bending region 142 of the metal pipe 124 is included between the temperature rising portion 138 and the temperature holding portion 140. In another embodiment, at least one seamless bending region 142 of the metal pipe 124 is included in the temperature holding portion 140. Similarly, at least one seamless bending region 142 of the metal pipe 124 can be included in the temperature rising portion 138. Any combinations of the seamless bending regions 142 in the temperature rising portion 138 and/or the temperature holding portion 140 are contemplated to suit the application.

Figure 5:
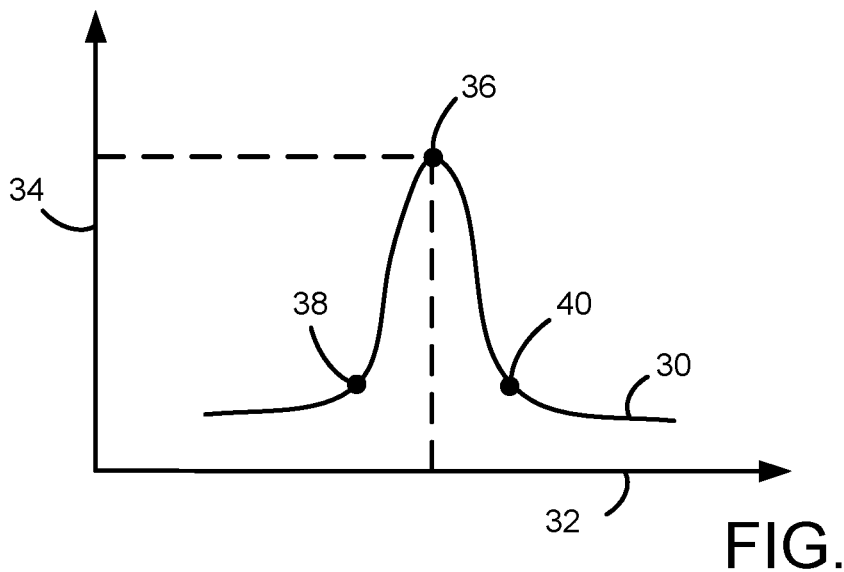
FIG. 5 illustrates an exemplary graphical presentation of a reaction level and a reaction amount of an aqueous solution having particles using the decomposing system of FIG. 2.

Referring now to FIG. 5, the induction heating assembly 102 provides the reaction level of the aqueous solution 110 that is consistent for the proper chemical reactions for the particles 112. In FIG. 5, an exemplary graphical presentation 30 of the reaction level and amount of the aqueous solution 110 is shown when using the induction heating assembly 102. In FIG. 5, an X-axis represents a reaction level 32 of the aqueous solution 110, and a Y-axis represents a reaction amount 34 of the aqueous solution 110.

For example, the reaction level 32 refers to a degree of chemical reaction occurred in the aqueous solution 110 (which turns into the treated product 114), and the reaction amount 34 refers to a volume or weight amount of the aqueous solution 110. As shown in FIG. 5, the reaction level 32 of the aqueous solution 110 is constant relative to the reaction amount 34.

In embodiments, each metal pipe 124 has a constant cross section configuration which causes a substantially constant reaction amount for the aqueous solution 110. In the illustrated embodiment, since only a combination of metal pipes 124 is used for high pressure piping, it is much easier and cheaper to manufacture the induction heating assembly 102 than the existing decomposing reactors.

Further, an optimal reaction amount at point 36, having a desired reaction level of the aqueous solution 110 can be readily achieved using the induction heating assembly 102. An insufficient reaction level at point 38 or an overabundant reaction level at point 40 can be readily distinguished from the desired reaction level 36 during decomposition of the particles 112. As such, the present disclosure reduces operational time and related expenses.

Figure 6:
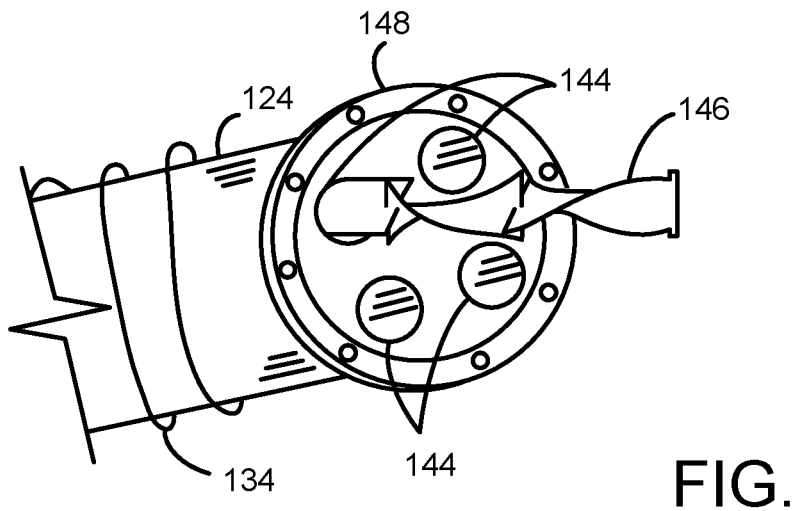
FIG. 6 illustrates a schematic diagram of an exemplary arrangement of the metal pipe used in the decomposing system of FIG. 2.

Referring now to FIG. 6, in some embodiments, the hollow portion of each metal pipe 124 can include one or more lumens 144 for delivering the aqueous solution 110. In one embodiment, the aqueous solution 110 having the plurality of particles 112 can be delivered in the temperature rising portion 138 using a static mixer 146 mounted in at least one lumen 144 of the hollow portion of the metal pipe 124.

In embodiments, adjacent metal pipes 124 are connected using connecting members 148 disposed at opposite ends of each metal pipe 124. For example, the connecting member 148 can be connected and tightened using one or more fasteners and corresponding nuts (not shown).

In some embodiments, a screw feeder, such as the static mixer 146 shown in FIG. 6, can be mounted in the hollow portion of the metal pipe 124. Other suitable static mixers can be used to suit different applications. In some embodiments, a flow rate of the aqueous solution 110 can be pulsated in at least one of: the temperature rising portion 138 and the temperature holding portion 140 to avoid unwanted settlement of the particles 112 in the metal pipe 124. In one embodiment, a control system 154 (FIG. 2) communicably connected to the pump 122 via a network 156 (FIG. 2) instructs the pump 122 to pulsate a power output of the pump 122 such that the flow rate of the aqueous solution 110 in the metal pipe 124 is varied.

In embodiments, the flow rate of the aqueous solution 110 can be pulsated in any portion of the metal pipe 124. The settlement of the particles 112 in the metal pipe 124, known as suspension, may cause an undesired decomposition result. Thus, the flow rate of the aqueous solution 110 in the metal pipe 124 can be set to a predetermined flow rate at which the suspension of the particles 112 does not precipitate.

In one embodiment, the static mixer 146 is inserted into the lumen 144 of the hollow portion of the metal pipe 124 to create the internal turbulent flow in the seamless bending region 142. Although one or more stirring blades, e.g., with the static mixers 146, can be used to stir or mix the aqueous solution in the metal pipe 124 during operation, the seamless bending region 142 of the metal pipe 124 can be specifically configured to create an internal turbulent flow in the seamless bending region 142.

Figure 7:
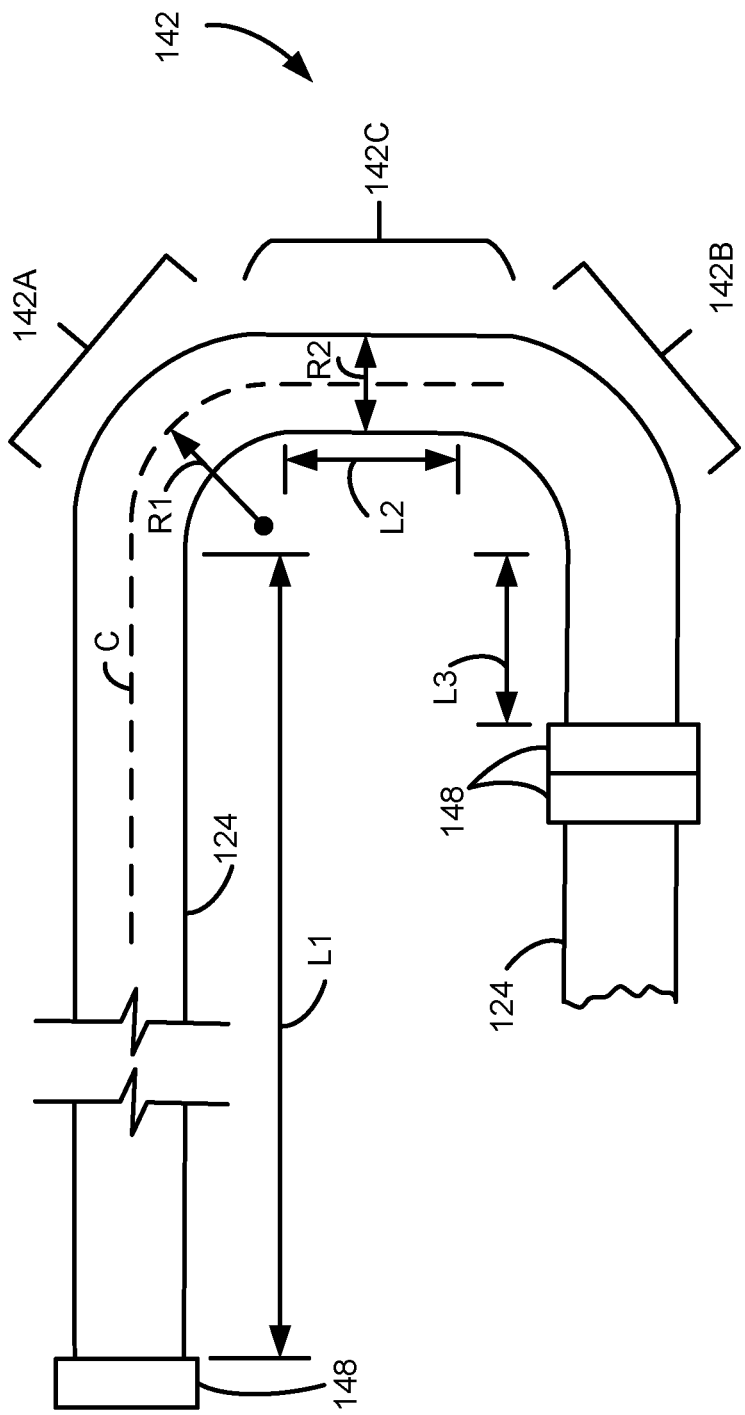
FIG. 7 illustrates a schematic diagram of an exemplary arrangement of a seamless bending region of the metal pipe used in the decomposing system of FIG. 2.

Referring now to FIGS. 3 and 7, in embodiments, the seamless bending region 142 has an elbowless portion between the temperature rising portion 138 and the temperature holding portion 140. In some embodiment, the seamless bending region 142 can have the elbowless portion in the temperature rising portion 138 and/or the temperature holding portion 140.

The elbowless portion may refer to a connection area between two adjacent metal pipes 124 without using any elbow or sleeve connector. For example, the elbowless portion is created by inductively heating and bending the metal pipe 124. In embodiments, the seamless bending region 142 is included in the temperature rising portion 138 and/or the temperature holding portion 140.

As shown in FIG. 7, in some embodiments, the seamless bending region 142 has a bending diameter R1 that is greater than an inner diameter R2 of the metal pipe 124 and up to three (3) times larger than the inner diameter R2 of the metal pipe 124. For example, the bending diameter R1 is defined by at least a portion of a central longitudinal axis C of the metal pipe 124 in the seamless bending region 142. An exemplary mathematical relation between R1 and R2 is shown below in expression (1):

$$R2 < R1 \leq 3*R2 \quad (1)$$

In this configuration, the internal turbulent flow is automatically generated within the metal pipe 124 in the seamless bending region 142 due to a current flow rate of the aqueous solution 110 in the metal pipe 124. A cross-sectional area and a flow velocity of the metal pipe 124 can vary based on the current flow rate of the aqueous solution 110 and/or the type of substance in the particles 112. During operation, the illustrated configuration provides the internal turbulent flow that causes a high-speed flow of the aqueous solution 110 in the metal pipe 124 to avoid clogging and also prevent unwanted precipitation or settlement of the particles 112 in the induction heating assembly 102.

In embodiments, the seamless bending region 142 includes a first bent portion 142A, a second bent portion 142B, and a straight portion 142C. Specifically, the first bent portion 142A and the second bent portion 142B are created by inductively heating and bending the metal pipe 124 such that the straight portion 142C is disposed between the first bent portion 142A and the second bent portion 142B.

As such, the first bent portion 142A, the straight portion 142C, and the second bent portion 142B are sequentially and seamlessly connected with one another without using any elbow or sleeve connector(s). At least one of the first bent portion 142A and the second bent portion 142B has the bending diameter R1 that is greater than the inner diameter R2 of the metal pipe 124 and up to three (3) times larger than the inner diameter R2 of the metal pipe 124.

In embodiments, each metal pipe 124 includes a first straight portion having a first predetermined length L1, a second straight portion having a second predetermined length L2, and a third straight portion having a third predetermined length L3. In the illustrated embodiment, L1 is longer than L2, and L2 is longer than L3. For example, L2 can be the straight portion 142C of the seamless bending region 142. In another embodiment, L1 is longer than L2 and L3, and L3 is longer than L2. Other suitable arrangements are also contemplated to suit the application. Exemplary mathematical relations between L1, L2, and L3 are shown below in expression (2):

$$\begin{cases} L3 < L2 < L1 \\ L2, L3 < L1; L2 < L3 \end{cases} \quad (2)$$

Figure 8:
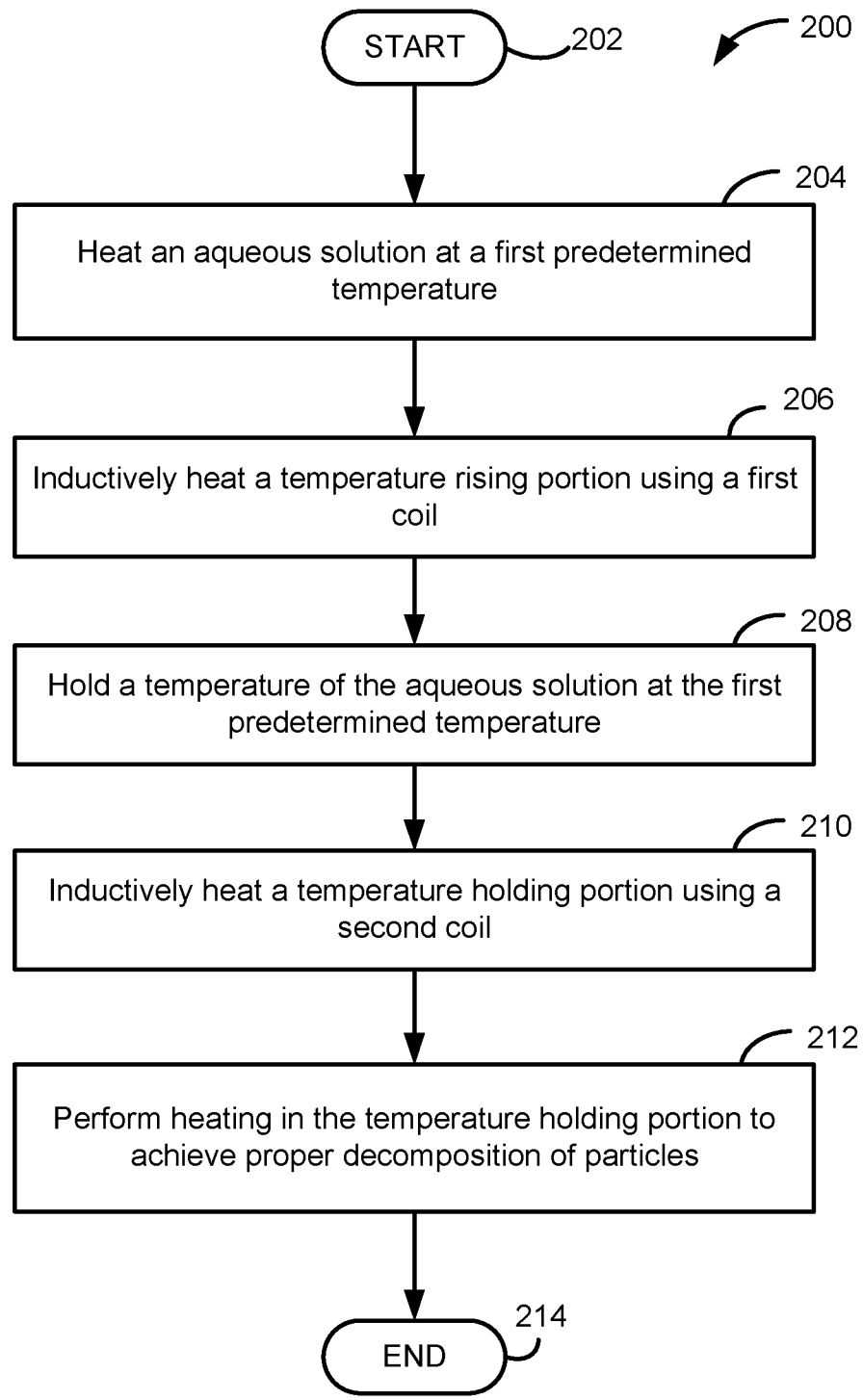
FIG. 8 is a flow chart of an exemplary method of decomposing a fluidic product using the decomposing system of FIG. 2 in accordance with embodiments of the present disclosure.

Referring now to FIG. 8, a flow chart of an exemplary method 200 of decomposing a fluidic product, such as the aqueous solution 110, having a plurality of particles, such as the particles 112, in accordance with embodiments of the present disclosure. The method 200 is shown in relation to FIGS. 1-7.

The method 200 can be implemented by the control system 154 (FIG. 2) communicably connected to the induction heating assembly 102 via the network 156. In one embodiment, the steps implementing the method 200 may be in the form of computer readable program instructions stored in one of memories of electronic controllers in the control system 154 and executed by a respective processor of the electronic controllers, or other computer usable medium.

In another embodiment, the steps implementing the method 200 may be stored and executed on a module or controller, such as the control system 154, which may or may not be independent from one of the electronic controllers of the decomposing system 100. The method 200 may run continuously or may be initiated in response to one or more predetermined events, such as an initial push of a start button (not shown). Any steps of the method 200 can be executed in any order suitable for the application.

The method 200 begins in step 202. In step 204, the control system 154 instructs the first heating induction coil 134 to inductively heat the aqueous solution 110 at a first predetermined temperature (e.g., 200° C.) while flowing through the temperature rising portion 138. As shown in FIG. 3, the temperature rising portion 138 has a first heating region formed of at least one metal pipe 124 in such a manner that a hollow portion of the metal pipe 124 functions as a flow path for the aqueous solution 110.

In step 206, the control system 154 instructs the first heating induction coil 134 to inductively heat the temperature rising portion 138. In one embodiment, the first heating induction coil 134 surrounds the first heating region of the temperature rising portion 138 to inductively heat the temperature rising portion 138 using the high-frequency power supply unit 128 for driving the first heating induction coil 134.

In step 208, the control system 154 instructs the second heating induction coil 136 to hold or maintain the temperature of the aqueous solution 110 at approximately the first predetermined temperature (e.g., 200° C.) for a predetermined reaction period (e.g., 5 minutes) while flowing through the temperature holding portion 140. As shown in FIG. 3, the temperature holding portion 140 has a second heating region formed of at least one metal pipe 124 in such a manner that the hollow portion of the metal pipe 124 functions as the flow path for the aqueous solution 110.

In step 210, the control system 154 instructs the second heating induction coil 136 to inductively heat the temperature holding portion 140. In one embodiment, the second heating induction coil 136 surrounds the second heating region of the temperature holding portion 140 to inductively heat the temperature holding portion 140 using the high-frequency power supply unit 128 for driving the second heating induction coil 136.

In step 212, the control system 154 instructs the second heating induction coil 136 to continuously or intermittently perform the heating in the temperature holding portion 140 to maintain the first predetermined temperature for the predetermined reaction period to achieve proper decomposition of the particles 112 in the aqueous solution 110. In one embodiment, the particles 112 are flowing through the temperature rising portion 138 and the temperature holding portion 140 during the predetermined reaction period.

The method 200 ends in step 214 and control may return to step 202. One or more of steps 204-212 can be repeated as desired.

It should be appreciated that any steps of the method 200 described herein may be implemented by a process controller, or other similar component, of the control system 154. Specifically, the process controller may be configured to execute computer readable instructions for performing one or more steps of the method 200. In one embodiment, the process controller may also be configured to transition from an operating state, during which a larger number of operations are performed, to a sleep state, in which a limited number of operations are performed, thus further reducing quiescent power draw of an electrical power source for the decomposing system 100.

The present disclosure is more easily comprehended by reference to the specific embodiments, examples and drawings recited hereinabove which are representative of the present disclosure. It must be understood, however, that the same are provided for the purpose of illustration, and that the present disclosure may be practiced otherwise than as specifically illustrated without departing from its spirit and scope. As will be realized, the present disclosure is capable of various other embodiments and that its several components and related details are capable of various alterations, all without departing from the basic concept of the present disclosure.

Accordingly, descriptions will be regarded as illustrative in nature and not as restrictive in any form whatsoever. Modifications and variations of the system, method, and apparatus described herein will be obvious to those skilled in the art. Such modifications and variations are intended to come within the scope of the appended claims.

What is claimed is:

1. A method of converting a fluidic product having a plurality of particles into a treated product by decomposing the plurality of particles, the method comprising:

inductively heating the fluidic product at a first predetermined temperature using a first heating induction coil while flowing the fluidic product through a temperature rising portion having a first heating region formed of at least one metal pipe in such a manner that the at least one metal pipe of the temperature rising portion functions as a first flow path for the fluidic product;

cooling the first heating induction coil by flowing a refrigerant through a first refrigerant passage connected to the first heating induction coil;

holding a temperature of the fluidic product at approximately the first predetermined temperature for a predetermined reaction period by inductively heating a temperature holding portion using a second heating induction coil, while flowing the fluidic product through the temperature holding portion having a second heating region formed of at least one metal pipe in such a manner that the at least one metal pipe of the temperature holding portion functions as a second flow path for the fluidic product;

cooling the second heating induction coil by flowing the refrigerant through a second refrigerant passage connected to the second heating induction coil, wherein the first refrigerant passage and the second refrigerant passage are different;

wherein the at least one metal pipe in the temperature rising portion and the at least one metal pipe in the temperature holding portion each include a plurality of lumens, at least one of said plurality of lumens including the fluidic product and at least one of said plurality of lumens including a static mixer; and decomposing the plurality of particles in the fluidic product while flowing the fluidic product through the temperature rising portion and the temperature holding portion during the predetermined reaction period.

2. The method of claim 1, further comprising pulsating a flow rate of the fluidic product having the plurality of particles in the temperature rising portion and the temperature holding portion.

3. The method of claim 1, further comprising including the at least one bending region having an elbowless portion in at least one of: the temperature rising portion and the temperature holding portion.

4. The method of claim 3, further comprising including the at least one bending region having a bending diameter that is greater than an inner diameter of the at least one metal pipe and up to three times larger than the inner diameter of the at least one metal pipe in at least one of: the temperature rising portion and the temperature holding portion.

5. The method of claim 1, further comprising setting the first predetermined temperature between 100-350 degrees Celsius.

6. The method of claim 1, further comprising positioning the at least one metal pipe in the temperature rising portion lower than the at least one metal pipe in the temperature holding portion.

7. The method of claim 1, wherein the at least one bending region has a first bent portion, a second bent portion and a straight portion.

8. The method of claim 7, wherein the straight portion is disposed between the first bent portion and the second bent portion in each of the at least one bending region.

9. The method of claim 1, further comprising supplying a first predetermined electric power to the first heating induction coil surrounding the first heating region, and supplying a second predetermined electric power to the second heating induction coil surrounding the second heating region, wherein the second predetermined electric power is lower than the first predetermined electric power.

* * * * *